United States Patent
Biessener et al.

(10) Patent No.: US 6,948,039 B2
(45) Date of Patent: Sep. 20, 2005

(54) DATA BACKUP AND RESTORATION USING DYNAMIC VIRTUAL STORAGE

(75) Inventors: Gaston R. Biessener, St. Paul, MN (US); David W. Biessener, Woodbury, MN (US); Michael T. Checky, Mahtomedi, MN (US)

(73) Assignee: Voom Technologies, Inc., Lakeland, MN (US)

( * ) Notice: Subject to any disclaimer, the term of this patent is extended or adjusted under 35 U.S.C. 154(b) by 472 days.

(21) Appl. No.: 10/020,086

(22) Filed: Dec. 14, 2001

(65) Prior Publication Data

US 2003/0115432 A1 Jun. 19, 2003

(51) Int. Cl.$^7$ .............................................. G06F 12/00
(52) U.S. Cl. ...................... 711/162; 711/161; 711/203; 711/6; 707/204; 718/1; 718/100
(58) Field of Search ................................ 711/162, 161, 711/6, 203; 707/204; 718/1, 100

(56) References Cited

U.S. PATENT DOCUMENTS

| | | |
|---|---|---|
| 4,819,154 A | 4/1989 | Stiffler et al. |
| 4,959,774 A | 9/1990 | Davis |
| 5,212,784 A | 5/1993 | Sparks |
| 5,241,670 A | 8/1993 | Eastridge et al. |
| 5,269,022 A | 12/1993 | Shinjo et al. |
| 5,357,509 A | 10/1994 | Ohizumi |
| 5,469,573 A | 11/1995 | McGill et al. |
| 5,487,160 A | 1/1996 | Bemis |
| 5,572,659 A | 11/1996 | Iwasa et al. |
| 5,724,501 A | 3/1998 | Dewey et al. |
| 5,740,397 A | 4/1998 | Levy |
| 5,742,792 A | 4/1998 | Yanai et al. |
| 5,758,057 A | 5/1998 | Baba et al. |
| 5,777,874 A | 7/1998 | Flood et al. |
| 5,799,141 A | 8/1998 | Galipeau et al. |
| 5,829,045 A | 10/1998 | Motoyama |
| 5,829,046 A | 10/1998 | Tzelnic et al. |
| 6,000,020 A | 12/1999 | Chin et al. |
| 6,038,639 A * | 3/2000 | O'Brien et al. ............. 711/114 |
| 6,044,444 A | 3/2000 | Ofek |
| 6,047,294 A * | 4/2000 | Deshayes et al. ........... 707/204 |
| 6,061,770 A | 5/2000 | Franklin |
| 6,081,875 A | 6/2000 | Clifton et al. |
| 6,131,148 A | 10/2000 | West et al. |
| 6,269,431 B1 * | 7/2001 | Dunham ...................... 711/162 |
| 6,366,987 B1 | 4/2002 | Tzelnic et al. |
| 6,434,681 B1 | 8/2002 | Armangau |
| 6,532,527 B2 * | 3/2003 | Selkirk et al. ............... 711/203 |
| 6,549,992 B1 | 4/2003 | Armangau et al. |
| 6,557,089 B1 | 4/2003 | Reed et al. |
| 6,708,227 B1 * | 3/2004 | Cabrera et al. ............. 719/328 |
| 2002/0053009 A1 * | 5/2002 | Selkirk et al. ............... 711/162 |
| 2002/0103982 A1 | 8/2002 | Ballard et al. |
| 2002/0144044 A1 | 10/2002 | Moon et al. |
| 2002/0199073 A1 | 12/2002 | Tamura et al. |
| 2003/0005248 A1 * | 1/2003 | Selkirk et al. ............... 711/165 |
| 2003/0014605 A1 | 1/2003 | Slater et al. |
| 2003/0018657 A1 | 1/2003 | Monday |
| 2003/0023673 A1 * | 1/2003 | Tso ............................ 709/203 |
| 2003/0061456 A1 | 3/2003 | Ofek et al. |

OTHER PUBLICATIONS www.TigerDirect.com; Catalog Excerpt, Date Unkown, p. 92XKD; Showing Goback Utilities Software.

* cited by examiner

Primary Examiner—Stephen C. Elmore
(74) Attorney, Agent, or Firm—Shumaker & Sieffert, P.A.

(57) ABSTRACT

A system is described including a processor, a storage system having one or more physical storage devices, and a controller coupled to the processor and the storage system. The controller maintains a virtual storage map (VSM) allocating a primary virtual storage and a secondary virtual storage within a storage system. The controller stores data received from the processor prior to a time T0 on the primary virtual storage, stores data received from the processor after time T0 on the secondary virtual storage. The controller updates the VSM in response to a save command to reallocate the primary virtual storage to include data written to the secondary virtual storage. In this manner, the system can backup data in a manner that appears almost instantaneous to the user.

58 Claims, 10 Drawing Sheets

DATA BACKUP AND RESTORATION USING DYNAMIC VIRTUAL STORAGE

TECHNICAL FIELD

This invention relates generally to data storage and, more particularly, to backup and restoration of a storage device.

BACKGROUND

Typical computing environments include one or more computing devices, such as desktop computers, laptop computers, hand-held computers, database servers, file servers, web servers, supercomputers, and the like. Each of these devices typically includes one or more processors and storage media for storing data and executable software modules.

The loss of data due to an unforeseen event is of paramount concern to organizations or other computer users. The data may be lost, for example, by fire, flood, and other natural disasters, hardware failure, and even software viruses or other hostile network attacks. To mitigate the risk of loss, due to an unforeseen event, organizations typically make use of an archival and retrieval system to periodically backup the data. These systems may include a number of backup devices including remote storage devices, tape drives, optical jukeboxes and the like.

A backup operation is typically performed by one of a number of different commercially available software programs. The software programs often run on a computer coupled to a network of computers, and tend to consume network bandwidth when saving the data to a backup device. Consequently, these programs tend to require considerable time to backup critical data, and can often consume significant computing and network resources. Furthermore, the software program responsible for the backup and restoration may be subject to viruses or other network attacks, thereby increasing the risk to the organization.

SUMMARY

In general, the invention is directed to a system that makes use of dynamic virtual storage to save and restore data within a computing environment. The system may include a controller that saves data stored to one or more physical storage devices by defining a primary virtual storage and a secondary virtual storage. The controller may define the primary virtual storage and the secondary virtual storage within one or more logical storage volumes mapped to one or more physical storage devices. In this manner, the primary virtual storage and the secondary virtual storage may, for example, reside on physically separate storage mediums of separate devices, or may reside on a common storage medium within a storage device.

The controller uses the primary virtual storage to store an initial state of data written by a computing device prior to a point in time, referred to herein as time $T_0$. In other words, the primary virtual storage stores a snapshot of the data at time $T_0$. The controller uses the secondary virtual storage to store all data written by the computing device subsequent to time $T_0$. Consequently, the controller responds to read requests received from the computing device by selectively reading data from the secondary virtual storage and the primary virtual storage, depending on whether data stored by the primary virtual storage has been rendered obsolete by data stored by the secondary virtual storage.

The controller provides the ability to quickly create a new snapshot of the data by dynamically reallocating the primary virtual storage and the secondary virtual storage. In particular, the controller maintains a map that defines the allocation of the primary and secondary virtual storage. By adjusting the map, the controller can quickly reallocate the primary storage to include the data written to the secondary virtual storage, thereby establishing a new time $T_0$ for the primary virtual storage. In this manner, the controller can backup data in a manner that appears almost instantaneous to the user.

In one embodiment, the invention is directed to a method that includes storing a virtual storage map (VSM) allocating a primary virtual storage and a secondary virtual storage. The method further includes updating the VSM to reallocate the primary virtual storage to include data written to the secondary virtual storage. The VSM may define a set of storage units for each virtual storage, and updating the VSM may comprise updating the VSM to reallocate at least one storage unit from the secondary virtual storage to the primary storage device. The method may further include receiving a save command, and updating the VSM in response to the save command. The save command may be received in response to an actuated hardware switch from software executing on a host computer, from a handheld device, or the like.

In another embodiment, the invention is directed to a system including a processor, a storage system having one or more physical storage devices, and a controller coupled to the processor and the storage system. The controller maintains a virtual storage map (VSM) allocating a primary virtual storage and a secondary virtual storage within a storage system. The controller may include a computer-readable medium to store the VSM, may store the VSM within the storage system, or both. The controller stores data received from the processor prior to a time $T_0$ on the primary virtual storage, stores data received from the processor after time $T_0$ on the secondary virtual storage. The controller updates the VSM in response to a save command to reallocate the primary virtual storage to include data written to the secondary virtual storage. The system may include an input/output (I/O) device to issue the save command to the controller. The I/O device may, for example, issue commands to the controller upon actuation of a hardware switch. Alternatively, the I/O device may issue commands to the controller via a wireless signal.

In another embodiment, the invention is directed to an apparatus including a computer-readable medium to store a virtual storage map (VSM) allocating a primary virtual storage and a secondary virtual storage within a storage system, and a control unit to update the VSM to reallocate the primary virtual storage to include data written to the secondary virtual storage. The apparatus may include a first interface coupled to the control unit to receive storage requests from a processor, and a second interface coupling the control unit to the storage system. The apparatus may further include an input/output (I/O) interface to receive a save command directing the control unit to reallocate the primary virtual storage.

The invention provides a number of advantages. For example, the invention provides the ability to quickly backup data by dynamically reallocating virtual storage, such as by adjusting a virtual storage map. In this manner, the system can backup data in a manner that appears almost instantaneous to the user. The user, therefore, need not refrain from using the computing device for a significant period of time, as is often required by conventional backup mechanisms.

In addition, the controller may be used to provide a secure means for saving and restoring data that is not susceptible to malicious network users, viruses, or other such devices. The controller may, for example, provide a hardware interface for saving and restoring data that is physically separate from the computing device and the software executing thereon. A user, such as a system administrator, may save and restore the data by actuating a hardware switch or interacting with the controller via a secure dedicated connection or wireless link.

Furthermore, the controller may be used to provide additional security by filtering any unauthorized commands issued to a storage system via a host computer. The controller may, for example, filter unpublished, vendor-specific commands. In addition, the controller may filter published but unwanted commands, or may translate the unwanted command to an acceptable command. The controller may selectively filter the commands based on configuration information defined by a user, such as a system administrator. In this manner, the controller may provide a bus-level filter for access commands issued to the storage system.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
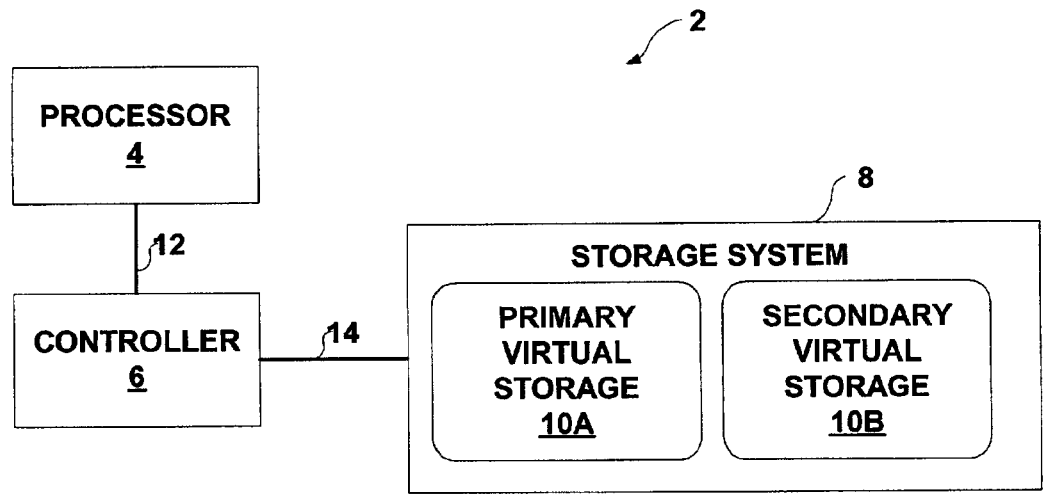
FIG. 1 is a block diagram illustrating an example system that makes use of dynamic virtual storage to save and restore data.

FIG. 1 is a block diagram illustrating an example system 2 that makes use of dynamic virtual storage to backup and restore data. System 2 includes a controller 6 coupled between processor and storage system 8. Processor 4 may be any type of programmable processor operating within a host computer or other device. Processor 4 may operate within, for example, a desktop computer, a laptop computer or a network server, such as a file server, a web server or a database server. In addition, processor 4 may be an embedded processor operating within a network or stand-alone appliance.

Storage system 8 provides a system for storing data and executable software modules for use by processor 4. Storage system 8 may comprise, for example, one or more physical storage devices including one or more hard disks, tape drives, removable storage media, optical storage media, volatile storage memory, EEPROM and the like.

Controller 6 receives storage access requests, such as conventional read and write requests, from processor 4 via interconnect 12. In response, controller 6 manages storage system 8 by issuing commands to storage system 8 via interconnect 14. Interconnects 12, 14 may conform to, for example, the small computer system interface (SCSI), a Fiber Channel interface, Integrated Drive Electronics/AT Attachment (IDE/ATA) interface, or the like. Storage system 8 may include one or more physical storage mediums, such as a conventional magnetic disk drives, magneto optical storage devices, and CDROMS.

As described in detail below, controller 6 manages storage system 8 to provide a secure backup for data written by processor 4. Moreover, controller 6 provides mechanisms to backup and restore data in a manner that appears instantaneous to a user. In particular, controller 6 allocates and maintains a primary virtual storage 10A and a secondary virtual storage 10B, collectively referred to as virtual storage 10, within storage system 8. Controller 6 may allocate virtual storage 10 according to one or more physical storage media of storage system 8. Alternatively, controller 6 may allocate virtual storage 10 according to logical storage volumes that are mapped to the underlying physical storage media of storage system 8. In this manner, the primary virtual storage and the secondary virtual storage may, for example, reside on physically separate storage mediums of separate devices, or may reside on a common storage medium within a storage device.

Controller 6 uses primary virtual storage 10A to store an initial state of data written by processor 4 prior to a point in time, referred to herein as time $T_0$. In other words, primary virtual storage 10A stores a snapshot of the data at time $T_0$. Controller 6 uses secondary virtual storage 10B to store all data written by processor 4 subsequent to time $T_0$. Consequently, controller 6 responds to read requests received from processor 4 by selectively reading data from secondary virtual storage 10B and the primary virtual storage 10A, depending on whether data stored by primary virtual storage 10A has been rendered obsolete by data stored by secondary virtual storage 10B. In order to respond a read request, controller 6 determines whether the requested data has been written to primary virtual storage 10A, or has been superceded by data written to secondary virtual storage 10B. Controller 6 then selectively reads data from secondary virtual storage 10B and primary virtual storage 10A in response to the read request.

In order to quickly and efficiently backup and restore data, controller 6 dynamically allocates and reallocates virtual storage 10. In particular, controller 6 maintains a virtual storage map (VSM) that defines the allocation of the primary and secondary virtual storage. Controller 6 may maintain the map within internal embedded memory, within storage system 8, or both. In response to a save (backup) command, controller 6 updates the VSM, dynamically reallocating primary virtual storage 10A to include the data written to secondary virtual storage 10B. Consequently, controller 6 dynamically reallocates secondary virtual storage 10B to exclude the data. In this manner, controller 6 quickly establishes a new time $T_0$ in which primary virtual storage 10A stores all of the data received prior to time $T_0$. In this manner, controller 6 can save (backup) the data in the manner that appears instantaneous to a user. Specifically, by dynamically allocating and reallocating virtual storage 10 upon receiving the save command, controller 6 avoids copying any of the actual data in order to perform a backup.

In addition to the ability to save data in a manner that appears instantaneous to a user, controller 6 can also revert back to the previously saved state in similar fashion. Specifically, upon receiving a restore command, controller 6 can simply disregard the data written to secondary virtual storage 10B, thereby reverting to the data stored by primary virtual storage 10A. In this manner, controller 6 can quickly revert to using data stored prior to a time $T_0$.

Furthermore, controller 6 may provide additional security by filtering any unauthorized commands received from processor 4. Controller 6 may, for example, filter unpublished, vendor-specific commands received from processor 4. In addition, controller 6 may filter published but unwanted commands, or may translate the unwanted command to an acceptable command. Controller 6 may selectively filter the commands based on configuration information defined by a user, such as a system administrator. In this manner, controller 6 may provide a bus-level filter for access commands issued to storage system 8.

Figure 2:
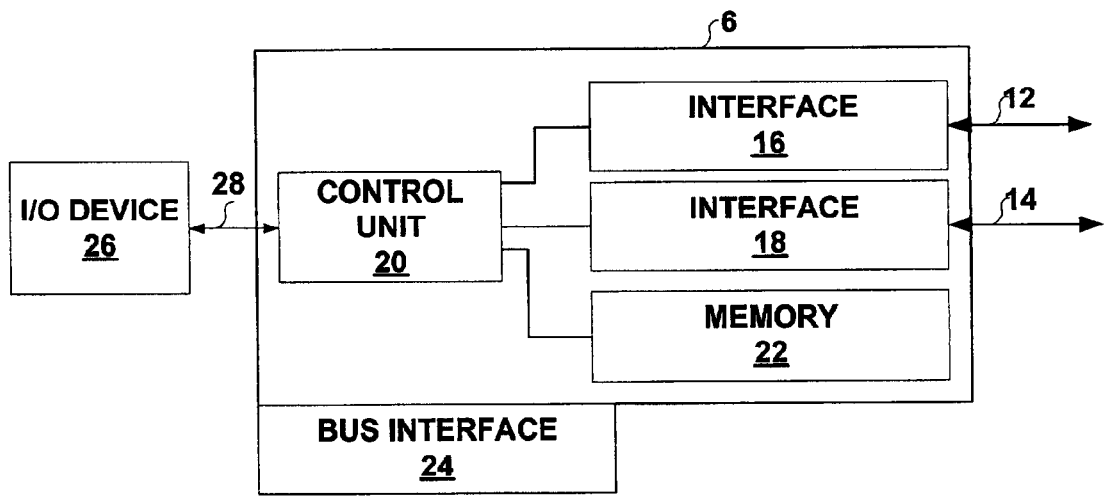
FIG. 2 illustrates an example embodiment of a backup controller implemented as a single printed circuit board that may be embedded within a host computing device.

FIG. 2 illustrates an example controller 6 implemented as a single printed circuit board that may be embedded within a host computing device. In this embodiment, controller 6 may include first interface 16, second interface 18, control unit 20, embedded memory 22 and bus interface 24. First interface 16 and second interface 18 provide mechanisms for coupling controller 6 between processor 4 and storage system 8, respectively. Specifically, control unit 20 receives storage access commands from processor 4 via interconnect 12 and first interface 16. In addition, control unit 20 manages and accesses storage system 8 via interconnect 14 and second interface 18. Although illustrated as implemented on a printed circuit board, controller 6 may be embedded within a mother board along with processor 4, within storage system 8, or within other components of system 2 disposed between processor 4 and storage system 8.

Control unit 20 stores the virtual storage map (VSM) within memory 22 to maintain a current allocation of primary virtual storage 10A and secondary virtual storage 10B within storage system 8. In addition, control unit 20 may, as described below, store other information within memory 22 including a record of the locations of secondary virtual storage 10B to which data has been written. Alternatively, control unit 20 may store the VSM and other information within storage system 8 for persistency, or within both memory 22 and storage system 8 for purposes of redundancy.

Control unit 20 receives data backup and restoration commands directly from I/O device 26. In particular, I/O device 26 may be a dedicated device by which a user issues commands to controller 6, thereby bypassing processor 4. In this manner, I/O device 26 and controller 6 provide a secure means for saving and restoring data within storage system 8. Consequently, controller 6 and storage system 8 are not subject to attacks via network hackers, viruses or other malicious software.

I/O device 26 may comprises a keyboard, pointing device or other conventional input mechanisms. In one embodiment, comprises a panel mounted to a host computing device. Alternatively, I/O device 26 may comprise a dedicated communication link or wireless device by which a user, such as a network administrator, may save and restore data within storage system 8. In this embodiment, signals 23 may represent wireless communications received by controller 6 from I/O device 26.

Bus interface 24 provides a mechanism by which controller 6 may be directly coupled to a system or I/O bus within a chassis of the host computer. Bus interface 24 may provide, for example, power and ground signals for use by controller 6.

Figure 3A:
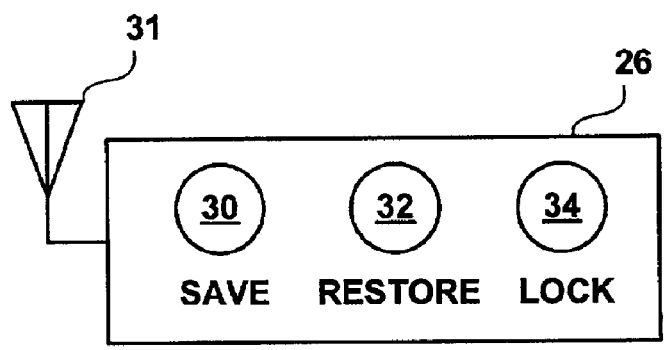
FIG. 3A illustrates an example embodiment of an input/output (I/O) device for issuing save and restore commands to the controller.

FIG. 3A illustrates an example embodiment in which I/O device 26 comprises a I/O panel mounted to the host computing device. In this embodiment, I/O device 26 includes a save button 30, a restore button 32, and a lock button 34. Actuation of save button 30 causes I/O device 26 to issue a save command to control unit 20 of controller 6. Similarly, actuation of restore button 32 causes I/O device 26 to issue a restore command to controller 6. Lock button 34 may be used to prevent controller 6 from performing an unauthorized or accidental save or restore operation. Specifically, actuation of lock 34 may prevent controller 6 from responding to a save command or restore command until specifically unlocked.

I/O device 26 may include other features such as a display of the last date and time at which a save was performed. In addition, I/O device 26 may include mechanisms by which a user enters an authorization code or provides other secure information such as a digital key to be used for authenticating the user.

I/O device 26 need not be directly coupled to the host computer device. For a wireless device, I/O device 26 may include antenna 31 to communicate with controller 6 via radio frequency or other appropriate mechanisms. I/O device 26 and controller 6 may be configured to communicate, for example, via cellular or infrared communications or may be enabled as BLUETOOTH applications. Alternatively, I/O device may comprise a removable panel that engages controller 6 via an I/O port of other communication means.

Figure 3B:
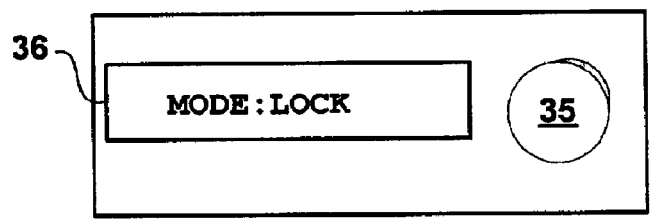
FIG. 3B illustrates another example embodiment of an input/output (I/O) device for issuing save and restore commands to the controller.

FIG. 3B illustrates another example embodiment in which I/O device 26 includes a display area 36 and an input dial 35. Controller 6 displays status information and a current operating mode within display area 36. By interacting with dial 35, a user may perform a number of operations including a restore or a save operation. In addition, the user may place controller 6 in a mode for receiving field upgrades to internal operating software. In one embodiment, controller 6 initializes to a safe mode, i.e., LOCKED, upon power-up, thereby requiring user interaction with dial 35 prior to processing SAVE or RESTORE commands. In this manner, controller 6 provides a security mechanism in the event that controller 6 accepts SAVE and RESTORE commands from software executing on processor 4 or a remote computing device.

Figure 4:
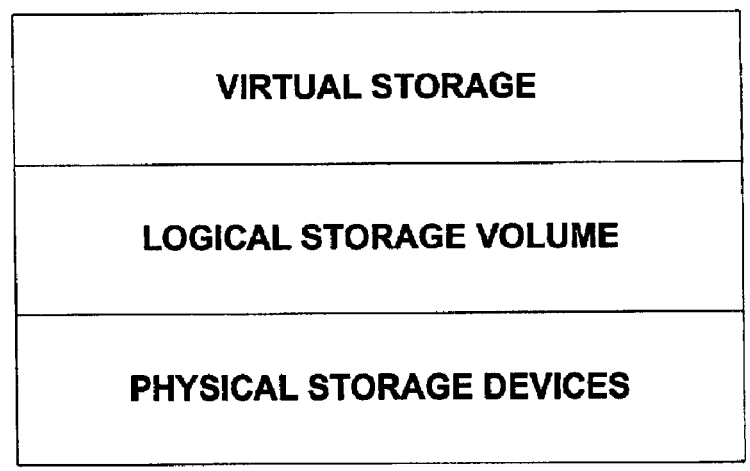
FIG. 4 is a block diagram illustrating the relationship of physical storage devices, logical storage volumes and virtual storage.

FIG. 4 is a block diagram illustrating the arrangement of, and relationship between, physical storage devices, logical storage volumes and the virtual storage. The underlying physical storage media may comprise one or more distinct hard disks, magnetic tape drives, removable storage media, optical storage devices, or the like. A number of logical storage volumes may then be defined and mapped upon the individual physical storage devices. For example, the physical storage devices may be grouped into a single logical storage volume, or multiple logical storage volumes. Also, a single logical storage volume may be mapped to multiple physical storage devices. Upon this layer of logical storage, controller 6 may define and maintain the virtual storage. In particular, controller 6 may allocate and dynamically reallocate primary virtual storage 10A and secondary virtual storage 10B within the logical storage volumes. Alternatively, controller 6 may map the virtual storage directly to physical storage media, thereby bypassing the logical storage volumes.

Figure 5:
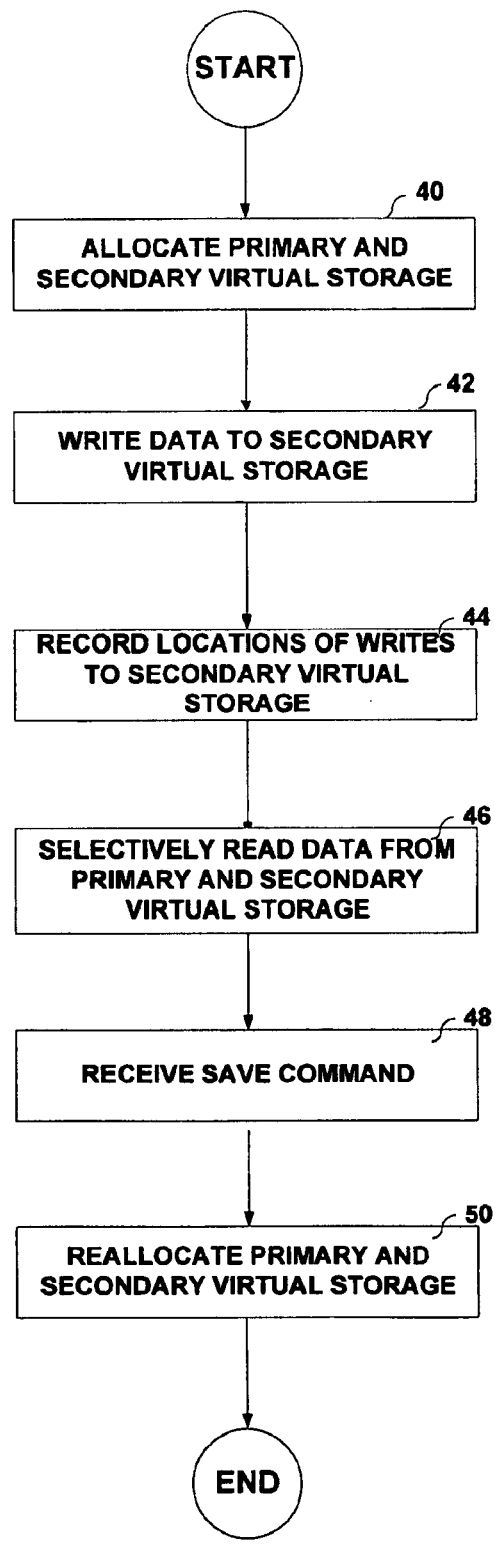
FIG. 5 is a flow chart illustrating a high-level overview of the functions performed by the controller.

FIG. 5 is a flow chart illustrating a high-level overview of the functions performed by controller 6. Initially, controller 6 allocates primary virtual storage 10A and secondary storage 10B within storage system 8 (40). In this manner, controller 6 defines an initial state at a time $T_0$ for primary virtual storage 10A and secondary virtual storage 10B. After allocating virtual storage 10, controller writes all data received from processor 4 to secondary virtual storage 10B (42).

Controller 6 maintains a record of the locations to which data has been written written to secondary virtual storage 10B subsequent to time $T_0$ (44). Controller 6 makes use of this record in order to respond to read requests received from processor 4. Specifically, upon receiving a read request, controller 6 selectively reads data from primary virtual storage 10A and secondary virtual storage 10B based upon the record (46). For example, if the record indicates that the requested data has been written subsequent to time $T_0$, controller 6 reads the data from secondary virtual storage 10B and forwards the data to processor 4. Otherwise, controller 6 reads the data from primary virtual storage 10A and forwards the data to processor 4.

Upon receiving a save command (48), controller 6 reallocates primary virtual storage 10A and secondary virtual storage 10B (50). In particular, controller 6 reallocates the virtual storage space to such that data written to to secondary virtual storage 10B subsequent to the time $T_0$ is allocated to primary virtual storage 10A and excluded from secondary virtual storage 10B. In this manner controller 6 establishes a new time $T_0$ in response to the save command (50).

Figure 6A:
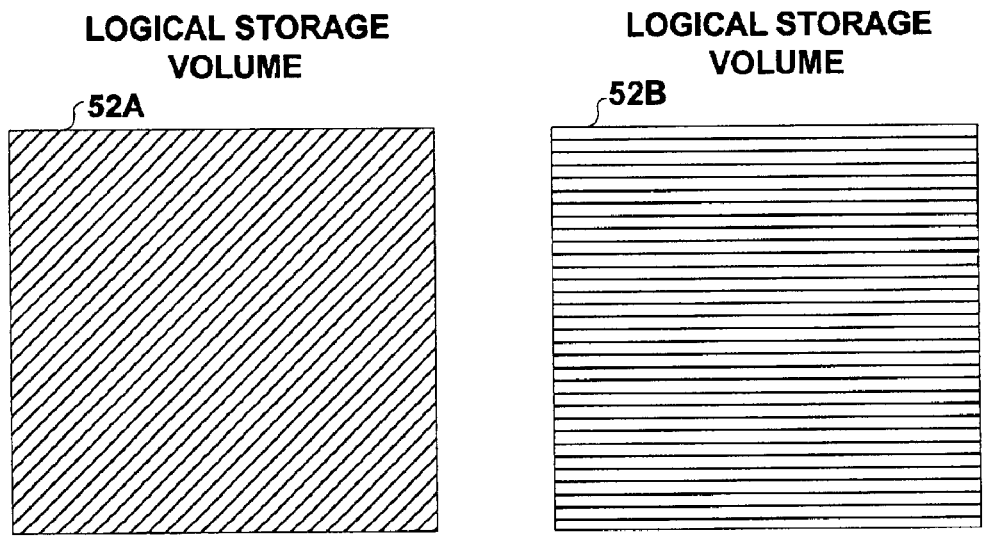
FIGS. 6A–6B illustrates the allocation and reallocation of primary and secondary virtual storage within two logical storage volumes.

FIG. 6A illustrates an example logical storage volume 52A and a logical storage volume 52B, collectively referred to as logical storage volumes 52, at a time $T_0$. In particular, FIG. 6A illustrates the initial allocation of primary virtual storage 10A and secondary virtual storage 10B within logical storage volumes 52. More particularly, primary virtual storage 10A is entirely allocated to logical storage volume 52A. Similarly, secondary virtual storage 10B is entirely allocated to logical storage volume 52B.

Figure 6B:
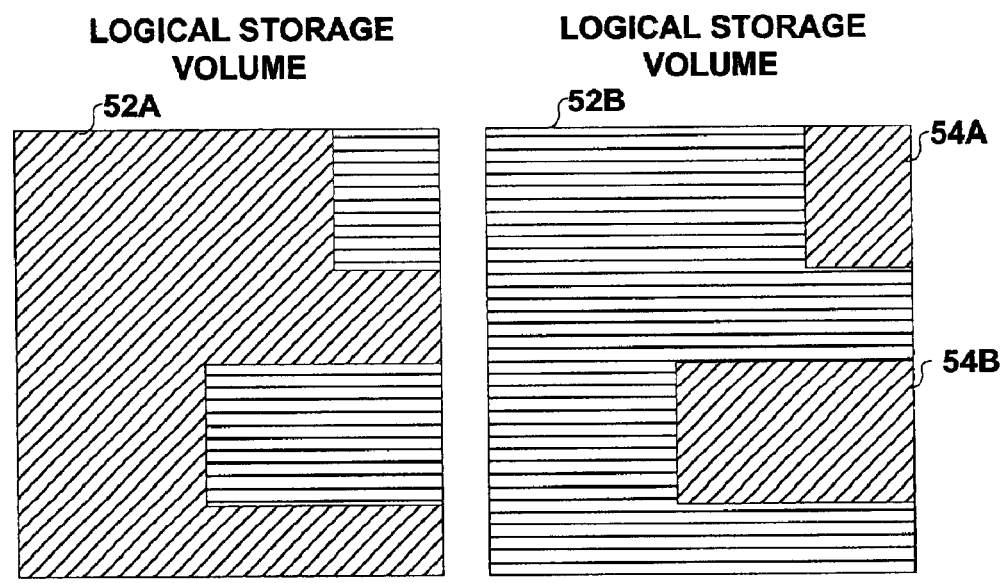

FIG. 6B illustrates the same logical storage volumes 52A at time a new time $T_0$ after controller 6 has performed a save operation, thereby reallocating virtual storage 10. In particular primary virtual storage 10A comprises a substantial portion of logical storage volume 52A, but has been reallocated to include portions of logical storage volume 52B.

Specifically, regions 54A and 54B of logical storage volume 52 have been allocated to primary virtual storage 10A. Similarly, the corresponding regions within logical storage volume 52A have been allocated to secondary virtual storage 10B. As illustrated, primary virtual storage 10A and secondary virtual storage 10B may be distributed throughout logical storage volumes 52 as a result of allocation and reallocation due to save commands. As described in further detail below, by reallocating virtual storage within the logical storage volumes, controller 6 is able to quickly perform a save operation in a manner that appears instantaneous to the user.

Figure 7:
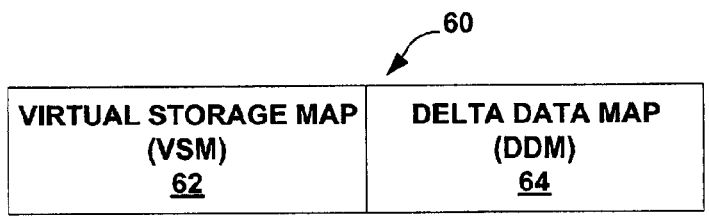
FIG. 7 is a block diagram illustrating one embodiment of a data structure maintained by the controller to allocate the virtual storage and to record data written to the secondary virtual storage.

FIG. 7 is a block diagram illustrating an example data structure 60 maintained by controller 6 to control the allocation of virtual storage 10, and to record the locations of data written to secondary virtual storage 10B. Specifically, in this embodiment, data structure 60 includes a virtual storage map (VSM) 62, and a delta data map (DDM) 64.

VSM 62 defines a set of logical storage units within each of primary virtual storage 10A and secondary virtual storage 10B. The units may correspond to ranges of addresses, data blocks, sectors, or other units of storage within virtual storage 10. In one embodiment, VSM 62 comprises a bitmap containing a set of binary values. Each binary value corresponds to a respective storage unit. A binary value of 1, for example, may indicate that the corresponding storage unit is allocated to primary virtual storage 10A. A binary value of 0, however, may indicate that the storage unit is allocated to secondary virtual storage 10B. Controller 6 may easily reallocate a storage unit from one virtual storage to another by changing a state of the corresponding binary value of VSM 62.

Similarly, in one embodiment, DDM 64 is a bitmap having a set of binary values. Each binary value of the set corresponds to a logical storage unit within secondary virtual storage 10B, and indicates whether data has been written to secondary virtual storage 10B subsequent to a time $T_0$. In this manner, controller 6 can readily determine whether to read data from secondary virtual storage 10B or from primary virtual storage 10A based on the DDM.

Figure 8:
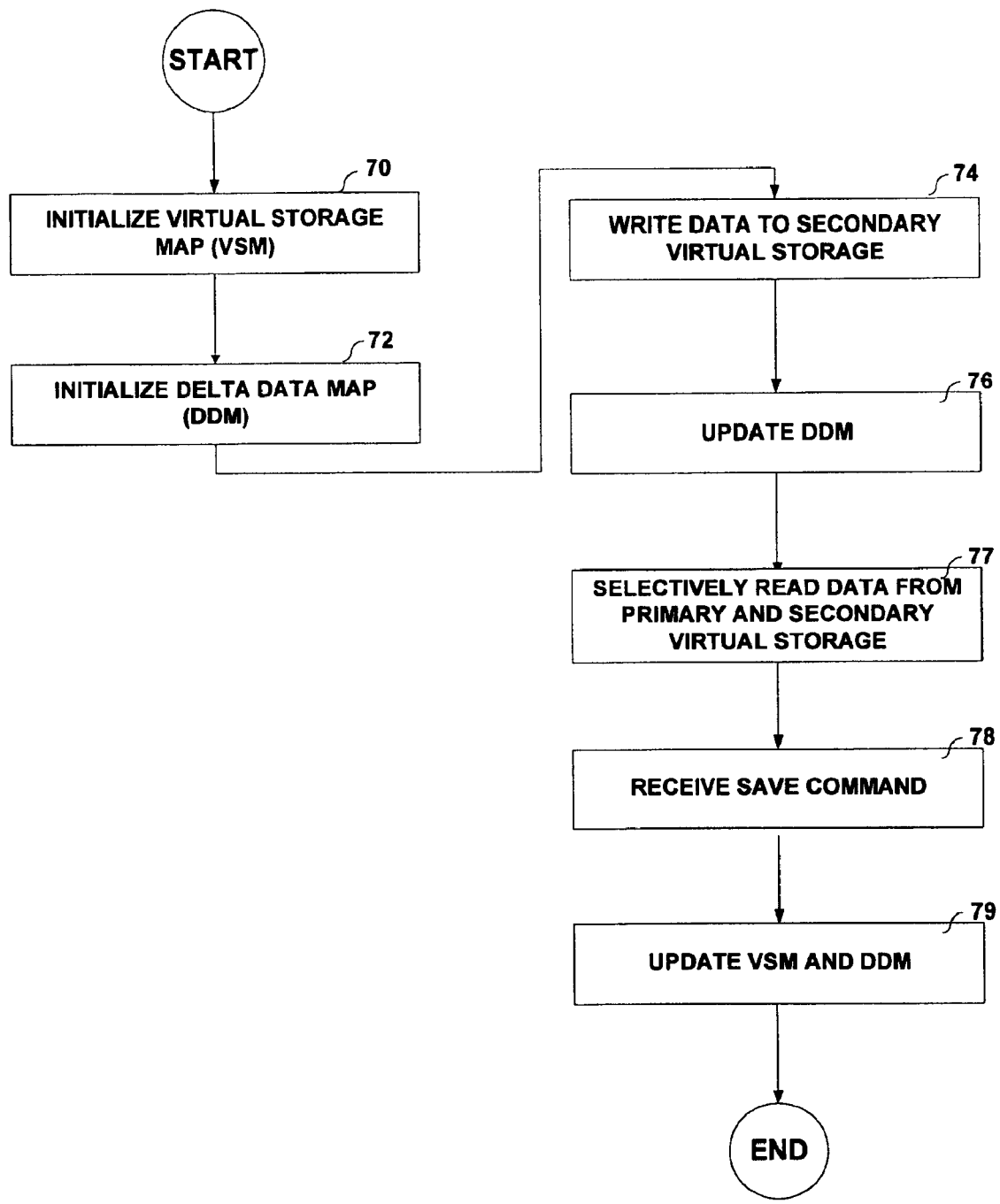
FIG. 8 is a flow chart illustrating the controller backing up data by dynamically reallocating virtual storage using the data structure of FIG. 7.

FIG. 8 is a flow chart illustrating the dynamic allocation of virtual storage 10 using data structure 60 of FIG. 7. Initially, controller 6 initializes virtual storage map (VSM) 62 to allocate primary virtual storage 10A and secondary virtual storage 10B (70). Controller 6 may, for example, initialize all of the binary values of VSM 62 to a null value, thereby allocating all storage units of primary virtual storage 10A to a first logical storage volume and all of the storage units of secondary virtual storage 10B to a second logical storage volume. FIG. 6A, as described above, illustrates an example initial allocation of primary virtual storage 10A and secondary virtual storage 10B.

Next, controller 6 initializes the delta data map (DDM) 64 by setting all of the binary values to a null value (72). In this manner, controller 6 resets DDM 64 to indicate that no data has yet been stored to secondary virtual storage 10B subsequent to the allocation. Next, controller 6 writes data to secondary virtual storage 10B in response to write requests received from processor 4 (74). After writing the data, controller 6 updates DDM 64 to record the locations of the data written to secondary virtual storage 10B (76). In particular, controller 6 may change the state of the corresponding binary values within DDM 64 from a null value to a logical one, thereby marking the storage units as containing data written subsequent to time $T_0$.

Upon receiving a read request from processor 4, controller 6 selectively reads data from primary virtual storage 10A and secondary virtual storage 10B based upon the state of the binary data within DDM 64 (78). More specifically, controller 6 reads the appropriate binary values of DDM 64 to determine whether the data requested by processor 4 has been written to secondary virtual storage 10B. If so, controller 6 reads the data from secondary virtual storage 10B and forwards the data to processor 4. If, however, the data has not been written from processor 4 subsequent to a time $T_0$, controller 6 reads the data from primary virtual storage 10A and forwards the data to processor 4.

Upon receiving a save command (78), controller 6 reallocates primary virtual storage 10A and secondary virtual storage 10B by updating VSM 62 and DDM 64 (79). In general, controller 6 examines DDM 64 to identify those storage units within secondary virtual storage 10B that contain data written by processor 4 subsequent to time $T_0$. Controller 6 then updates VSM 62 to reallocate primary virtual storage 10A to include the identified storage units of secondary virtual storage 10B (79). In this manner, the storage units of secondary virtual storage 10B that contain data written subsequent to time $T_0$ are redefined to be included within primary virtual storage 10A. Consequently, the corresponding storage units within primary virtual storage 10A that contain old data are automatically redefined to be included within secondary virtual storage 10B. Controller 6 resets DDM 64 by setting all of the binary values to null. In this manner, controller 6 marks all of the storage units within secondary virtual storage 10B as being initialized and available to store new data. In this manner, controller 6 establishes a new time $T_0$.

Figure 9A:
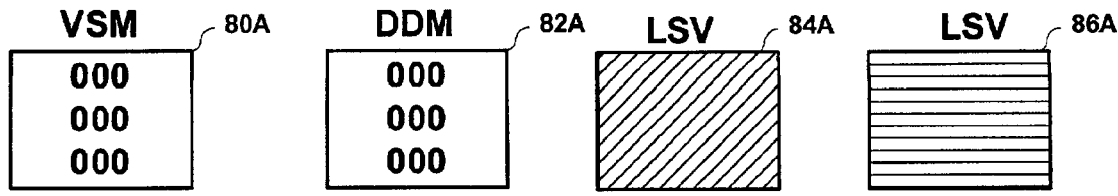
FIGS. 9A–9E illustrate in further detail the process of dynamically reallocating virtual storage to save data in a manner that appears instantaneous to a user.

FIGS. 9A–9E illustrate in further detail the process of dynamically reallocating virtual storage to save data in a manner that appears instantaneous to a user. FIG. 9A illustrates an initial state in which VSM 80A is reset such that primary virtual storage 10A is mapped entirely to a first logical storage volume, and secondary virtual storage 10B is mapped entirely to a second logical storage volume. In addition, DDM 82A is initialized to indicate that second virtual storage 10B currently contains no data written subsequent to a time $T_0$. Logical storage volumes 84A and 86A illustrate the current allocation of primary virtual storage 10A and second virtual storage 10B.

Figure 9B:
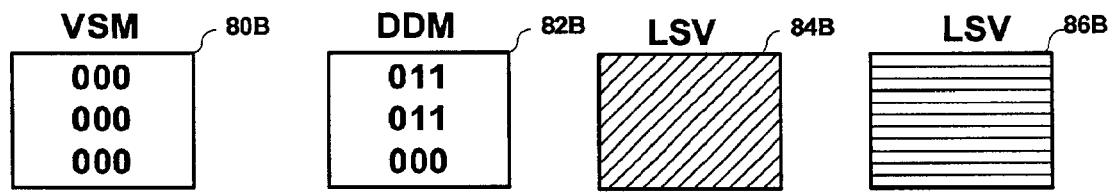

FIG. 9B illustrates the changes to DDM 82 after a number of write requests from processor 4. In particular, DDM 82B indicates that 4 storage units of secondary virtual storage 10B contain data that has been written subsequent to initial state of time $T_0$.

Figure 9C:
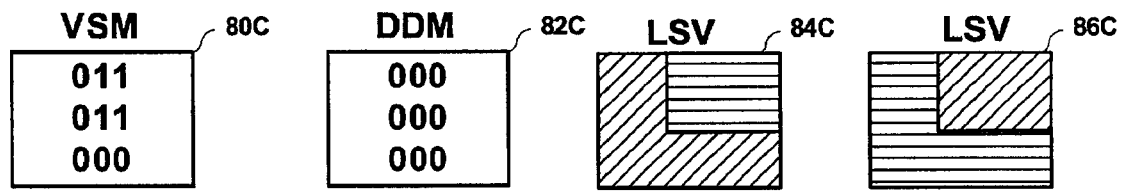

FIG. 9C illustrates the changes to VSM 80C and DDM 82C made by controller 6 in response to receiving a save command from a user, such as a system administrator. In particular, controller 6 identifies the storage units of DDM 82B that store data written subsequent to time $T_0$. Controller 6 then modifies VSM 80C to reallocate primary virtual storage 10A and secondary virtual storage 10B. In particular, controller 6 modifies the corresponding binary elements of VSM 80C such that primary virtual storage 10A includes those storage units of secondary virtual storage 10B to which data has been written subsequent to time $T_0$. This dynamic reallocation is illustrated by LSV 84C and LSV 86C. Controller 6 may quickly and efficiently effect this dynamic reallocation by performing an exclusive-or (XOR) operation between DDM 82C VSM 80C.

Figure 9D:
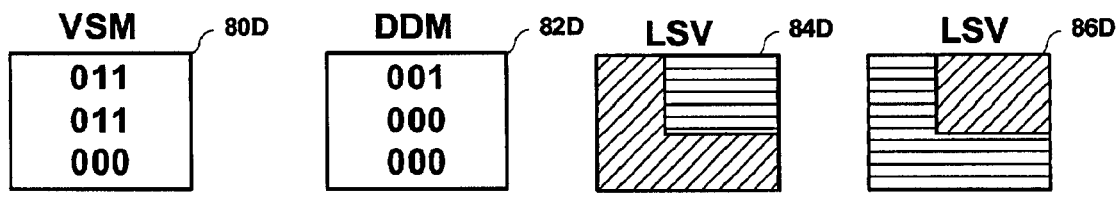

FIG. 9D illustrates the changes made to DDM 82D upon receiving an additional write request from processor 4. In particular, controller 6 writes the data to secondary virtual storage 10B and update DDM 82D.

Figure 9E:
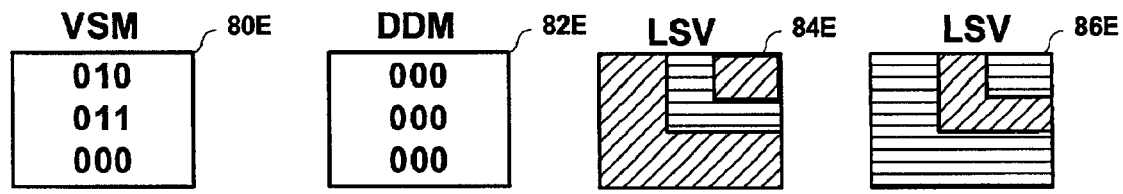

FIG. 9E illustrates the changes made by controller 6 in response to a second save command. In particular, controller 6 updates VSM 80E to reallocate primary virtual storage 10A and secondary virtual storage 10B, and clears DDM 82E.

Figure 10:
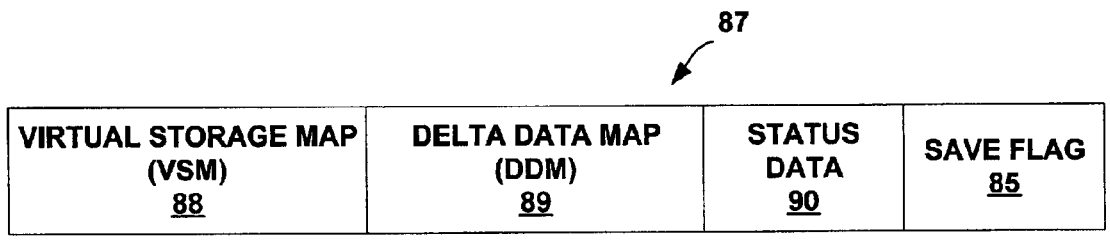
FIG. 10 is a block diagram illustrating another embodiment of a data structure maintained by the controller to allocate the virtual storage and to record locations of data written to the secondary virtual storage.

FIG. 10 is block diagram illustrating another example data structure 87 maintained by controller 6 for dynamically allocating and reallocating virtual storage. In this embodiment, data structure 87 includes VSM 88, DDM 89 and additional status data 90. In particular, status data 90 indicates whether each storage unit of the secondary virtual storage needs to be reallocated after a save command.

In particular, status data 90 may comprise a bitmap having a set of binary values. Each binary value may correspond to a storage unit within secondary virtual storage 10B. The state of the binary value represents whether the corresponding storage unit has been reallocated, if necessary, in response to a recent save command. In this manner, data structure 87 may be useful when controller 6 performs the reallocation in the background, such as during free cycles of a system bus within a host computing device. Thus, by including status data in the data structure, the reallocation can be performed solely during free cycles. If the free cycles are interrupted, status data 90 can maintain an indication of the status of the reallocation so that it can be finished during subsequent free cycles. In this manner, controller 6 can perform reallocation without using non-free cycles.

Figure 11:
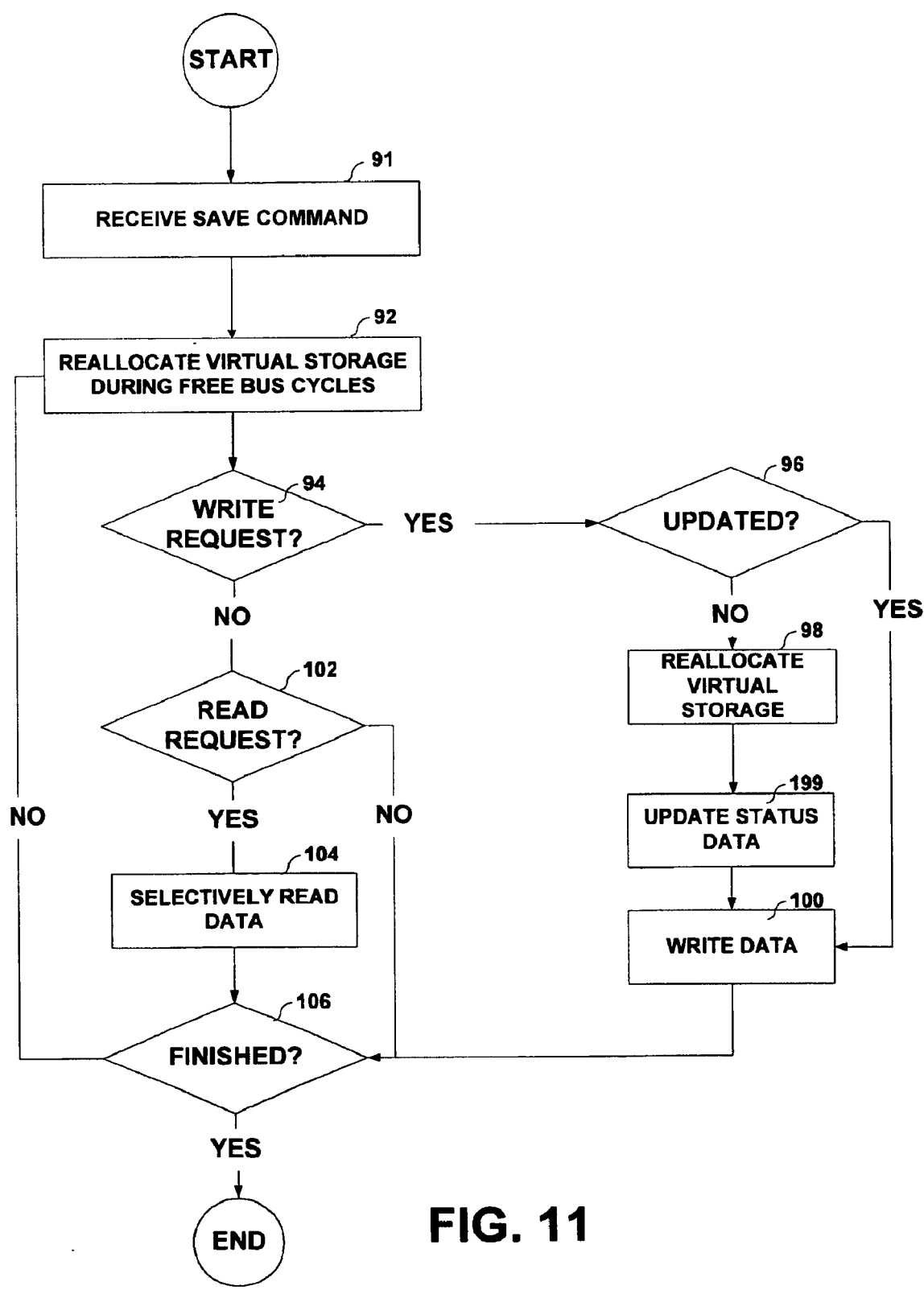
FIG. 11 is a flow chart illustrating the controller backing up data by dynamically reallocating virtual storage using the data structure of FIG. 10.

FIG. 11 is a flow chart illustrating the reallocation of virtual storage by controller 6 when making use of data structure 87. Upon receiving a save command (91), controller 6 sets a global flag indicating that a save must be performed and begins updating VSM 88 and DDM 89 during the background, i.e., between servicing of access requests received from processor 4 (91). Upon reallocating a storage unit, controller 6 sets the value of a corresponding bit within status data 90 to indicate that reallocation has either been performed or is not needed.

During this process, if controller 6 receives a write request (94), controller 6 accesses status data 90 to determine whether the storage units holding the requested data have been updated in response to the previous save command (96). If so, controller 6 immediately writes the data to the storage units of secondary virtual storage 10B (100). If not, controller 6 updates VSM 88 and DDM 89 (98) and status data 90 (99) prior to writing the data (100).

If a read request is received (102), controller 6 selectively reads data from primary virtual storage 10A and secondary virtual storage 10B in accordance with DDM 89 as described above (104). Controller 6 continues to update status data 90 in the background until all of the storage units containing data written subsequent to time $T_0$ have been reallocated from secondary virtual storage 10B to primary virtual storage 10A (106).

Figure 12:
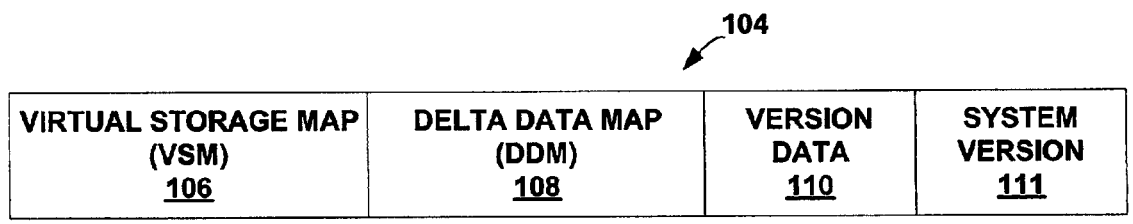
FIG. 12 is a block diagram illustrating another embodiment of a data structure maintained by the controller to allocate the virtual storage and to record locations of data written to the secondary virtual storage.

FIG. 12 is a block diagram illustrating another embodiment of a data structure 104 maintained by controller 6 for dynamically allocating and reallocating virtual storage. In this embodiment, data structure 104 includes VSM 106, DDM 108, version data 110 and a system version 111. In particular, version data 110 stores a version number for each storage unit of secondary virtual storage 10B. More specifically, the version number corresponds to a save command received by controller 6, and indicates whether the storage unit is up to date. System version 111 stores the most recent version for all of secondary virtual storage 10B, and is based upon the save commands received from I/O device 26. In particular, each time controller 6 receives a save command, controller 6 increments system version 111.

Figure 13:
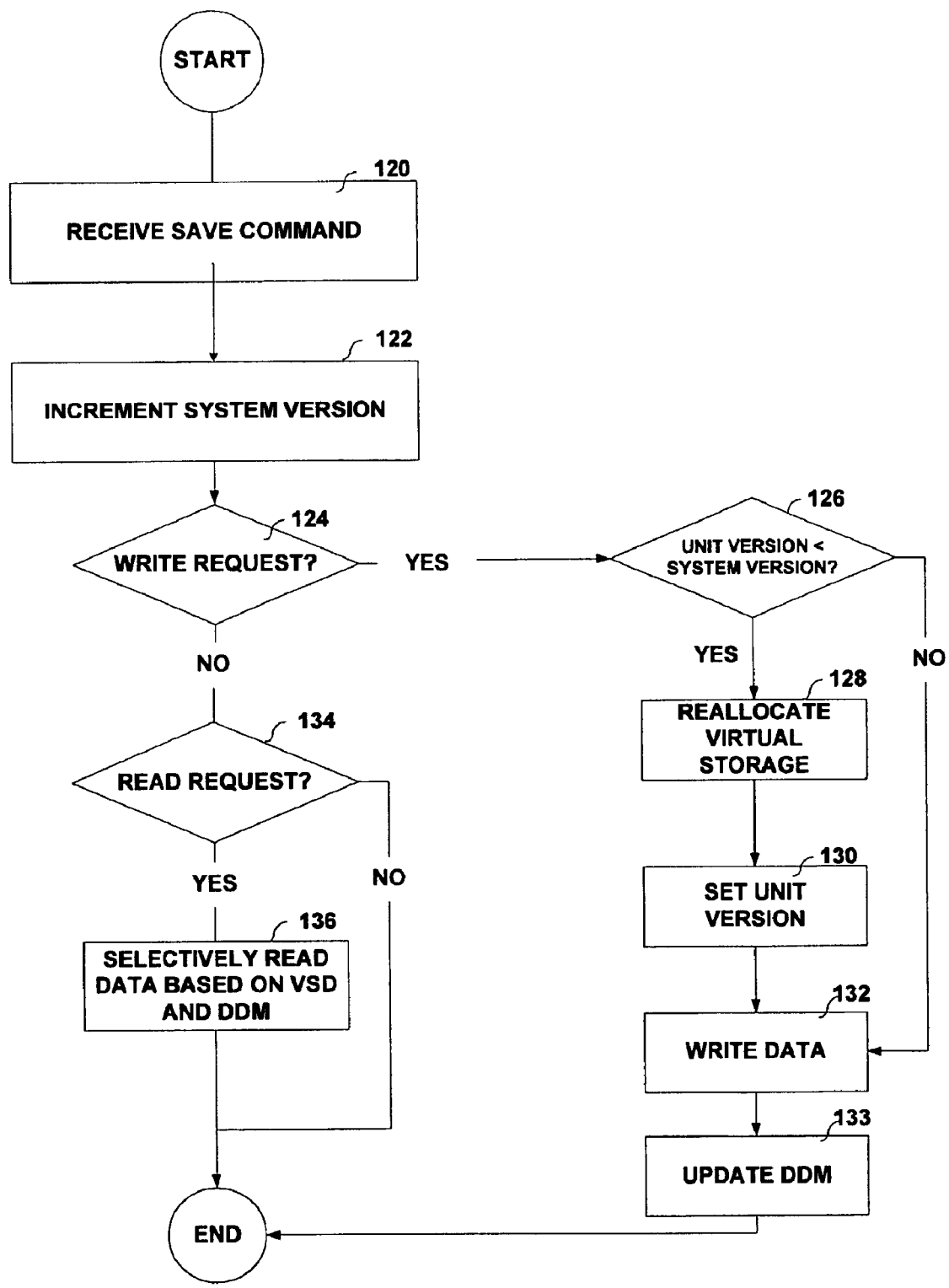
FIG. 13 is a flow chart illustrating the controller backing up data by dynamically reallocating virtual storage using the data structure of FIG. 12.

FIG. 13 is a flow chart illustrating the operation of controller 6 when using data structure 104 of FIG. 12. Upon receiving a save command (120), controller 6 increments the system version 111 (122). Upon receiving a write request (124) controller 6 compares the version for the requested storage unit, as indicated by version data 110, with the system version 111 (126).

If the version number for the requested storage unit is less than system version 111, controller 6 initiates a reallocation of the storage unit from secondary virtual storage 10B to primary virtual storage 10A (128) and sets the version number for the storage unit to system version 111 (130). Next, controller 6 writes the data to the storage unit of secondary virtual storage 10B (132) and updates DDM 108 to indicate that the storage unit contains data subsequent to the last save command (133).

If however, the version number for the storage unit requested is equal to system version 111, controller 6 writes the data to secondary virtual storage 10B (132) without updating VSM 106 to reallocate storage units (132) and updates DDM 108 (133). If controller 6 receives a read request, controller 6 accesses DDM 108 and selectively reads data from secondary virtual storage 10B and primary virtual storage 10A (136).

Figure 14:
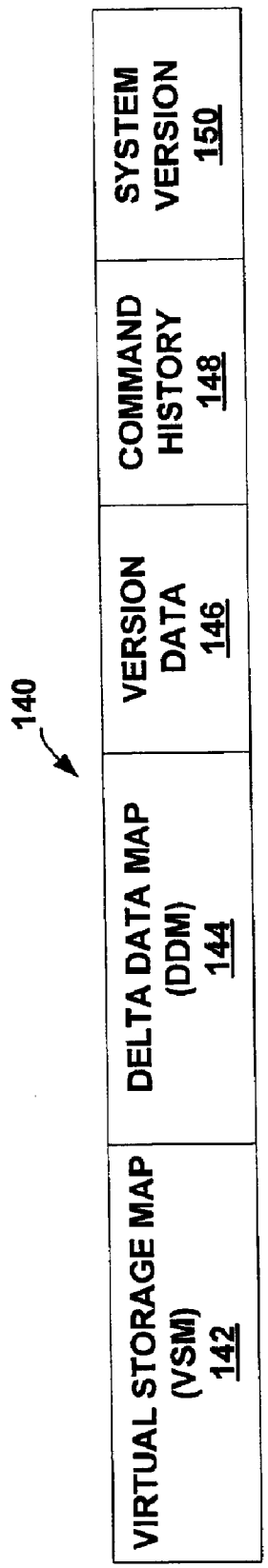
FIG. 14 is a block diagram illustrating another embodiment of a data structure maintained by the controller to allocate the virtual storage.

FIG. 14 is a block diagram illustrates another embodiment of a data structure 140 maintained by controller 6 for dynamically allocating and reallocating virtual storage. In this embodiment, data structure 140 includes VSM 142, DDM 144, version data 146, command history 148 and a system version 150. In particular, command history 148 is a log indicating the sequence of save and restore commands received be controller 6. Command history 148 may comprise, for example, a bitmap in which a binary value of one represents a save command and a binary value of zero represents a restore command. A sequence of 11101, for example, represents the following sequence: SAVE, SAVE, SAVE, RESTORE, SAVE.

In this embodiment, version data 110 may store an index into command history 148. In this manner, the version number indicates the last command, save or restore, applied to a particular storage unit of secondary virtual storage 10B. In other words, by indexing into command history 148, the version number indicates a current state for the respective storage unit.

Upon receiving a read request from processor 4, controller 6 accesses version data 146 to determine if the version for the accessed storage unit is less than system version 150. If so, controller 6 reallocates VSM 142 and updates the version data 146 for the accessed storage unit. In this manner, controller 6 may update data structure 140 within local memory 22. For write requests, controller 6 may perform a similar operation and save data structure 140 to storage system 8.

Upon receiving a save or restore command, controller 6 may update command history 148 to reflect the command, save data structure 140 to storage system 8, and increment system version 150. This allows controller 6 to perform a save or restore in a manner that appears instantaneous to the user.

Various embodiments of the invention have been described. These and other embodiments are within the scope of the following claims.

What is claimed is:

1. A method comprising:
    storing a virtual storage map (VSM) to allocate a primary virtual storage and a secondary virtual storage; and
    updating the VSM to reallocate the primary virtual storage to include data written to the secondary virtual storage.

2. The method of claim 1, wherein the VSM allocates a set of storage units for each virtual storage, and further wherein updating the VSM comprises updating the VSM to reallocate at least one storage unit from the secondary virtual storage to the primary storage device.

3. The method of claim 1, further comprising:
    receiving a save command; and
    updating the VSM in response to the save command.

4. The method of claim 3, wherein receiving a save command comprises receiving a signal in response to an actuated hardware switch.

5. The method of claim 3, wherein receiving a save command comprises receiving the save command from software executing on a host computer.

6. The method of claim 3, wherein receiving a save command comprises receiving a signal from a handheld device.

7. The method of claim 6, wherein receiving the signal from the handheld device comprises receiving a wireless communication from the handheld device.

8. The method of claim 1, further comprising:
    storing data received from a host computer prior to a time $T_0$ on the secondary virtual storage.

9. The method of claim 8, further comprising storing a record of locations within secondary virtual storage to which the data written has been written.

10. The method of claim 9, further comprising selectively reading data from the primary virtual storage and the secondary virtual storage based on the record.

11. The method of claim 9, wherein the VSM allocates a set of storage units for each virtual storage, and wherein storing a record comprises storing a delta data map (DDM) to indicate those storage units of the secondary virtual storage to which the data has been written.

12. The method of claim 11, wherein the DDM and the VSM comprises bitmaps having a set of binary values, wherein each binary value corresponds to a respective storage unit, and further wherein updating the VSM includes changing a state of at least one of the binary values.

13. The method of claim 1, wherein the VSM defines a set of storage units within one or more logical storage volumes, and further wherein the logical storage volumes comprise one or more physical storage mediums.

14. The method of claim 1, wherein storing the VSM comprises storing the VSM in a computer-readable medium coupled to a host computer.

15. The method of claim 1, wherein storing the VSM comprises storing the VSM in an embedded memory of a controller coupled to a host computer via an input/output (I/O) bus.

16. The method of claim 1, where updating the VSM comprises:
    storing a record of locations of the secondary virtual storage to which the data has been written after a time $T_0$;
    receiving a save command at a time $T_0$ where $T_s > T_0$; and
    in response to the save command, adjusting the VSM to redefine the primary virtual storage to include the data written to the secondary storage device after $T_0$.

17. The method of claim 1, further comprising:
storing the VSM as a bitmap defining a set of storage units for each virtual storage, wherein each binary value of the bitmap corresponds to a storage unit within each set; and
storing a delta data map (DDM) as a bitmap to indicate those storage units of the secondary virtual storage to which data has been written after a time $T_0$.

18. The method of claim 17, wherein updating the VSM comprises:
setting each bit of the VSM bitmap based upon an exclusive or operation (XOR) of clearing the corresponding bit within the DDM.

19. The method of claim 1, further comprising:
storing the VSM to define a set of storage units for the primary virtual storage and the secondary virtual storage; and
storing status data for each storage unit of secondary virtual storage, wherein the status data indicates whether each storage unit needs to be reallocated.

20. The method of claim 19, wherein updating the VSM comprises:
updating the VSM to reallocate the primary virtual storage during free cycles of a bus; and
updating the corresponding status data while updating the VSM.

21. The method of claim 1, further comprising:
storing the VSM to define a set of storage units for the primary virtual storage and the secondary virtual storage; and
storing version information for the storage units of secondary virtual storage, wherein the version information indicates a current version for each storage unit of the secondary virtual storage.

22. The method of claim 21, wherein updating the VSM comprises:
incrementing a system version indicator upon receiving a save command;
in response to a write request to a storage unit of the secondary virtual storage, comparing the system version indicator with the save version for the storage unit indicated by the write request;
reallocating the primary virtual storage based on the comparison; and
updating the version for the storage unit indicated by the write request.

23. An apparatus comprising:
a computer-readable medium to store a virtual storage map (VSM) that represents an allocation of a primary virtual storage and a secondary virtual storage within a storage system; and
a control unit to update the VSM to reallocate the primary virtual storage to include data written to the secondary virtual storage.

24. The apparatus of claim 23, further comprising:
a first interface coupled to the control unit to receive storage requests from a processor; and
a second interface coupling the control unit to the storage system.

25. The apparatus of claim 23, further comprising an input/output (I/O) interface to receive a save command, wherein the control unit reallocates the primary virtual storage in response to the save command.

26. The apparatus of claim 25, wherein the I/O interface receives a signal from an actuated switch.

27. The apparatus of claim 25, wherein the I/O interface receives a wireless signal.

28. The apparatus of claim 25, wherein the I/O interface receives the save command from software executing on a computing device.

29. The apparatus of claim 23, wherein the VSM represents allocation of a set of storage units for each virtual storage, and further wherein the control unit reallocates at least one storage unit from the secondary virtual storage to the primary storage device.

30. The apparatus of claim 23, wherein the control unit stores data received from a processor prior to a time $T_0$ on the primary virtual storage, and further wherein the control unit stores data received from the processor after time $T_0$ on the secondary virtual storage.

31. The apparatus of claim 23, wherein the computer-readable medium further stores a record of locations of the secondary virtual storage to which data has been written.

32. The apparatus of claim 31, wherein the control unit selectively reads data from the primary virtual storage and the secondary virtual storage based on the record.

33. The apparatus of claim 31, wherein the VSM represents allocation of a set of storage units for each virtual storage, and the record comprises a delta data map (DDM) to indicate those storage units of the secondary virtual storage to which the data has been written.

34. The apparatus of claim 33, wherein the DDM and the VSM comprises bitmaps having a set of binary values wherein the control unit reallocates the primary virtual storage by changing a state of at least one of the binary values.

35. The apparatus of claim 34, wherein the control unit reallocates the primary virtual storage by setting each bit of the VSM bitmap based upon an exclusive or (XOR) of the binary value of VSM bit and a corresponding bit within the DDM, and clearing the corresponding bit within the DDM.

36. The apparatus of claim 23, wherein the VSM represents allocation of a set of storage units for each of the virtual storages, and further wherein the computer-readable medium stores status data indicating whether each storage unit of the secondary virtual storage needs to be reallocated.

37. The apparatus of claim 23, wherein the VSM represents allocation of a set of storage units for each of the virtual storages, and further wherein the computer-readable medium stores version data indicating a current version for each storage unit of the secondary virtual storage.

38. A system comprising:
a processor;
a storage system having one or more physical storage devices; and
a controller coupled to the processor and the storage system, wherein the controller maintains a virtual storage map (VSM) that represents an allocation of a primary virtual storage and a secondary virtual storage within a storage system.

39. The system of claim 38, wherein the controller stores the VSM with the storage system.

40. The system of claim 38, wherein the controller stores the VSM within the storage system.

41. The system of claim 38, wherein the controller stores data received from a processor prior to a time $T_0$ on the primary virtual storage, and further wherein a control unit stores data received from the processor after time $T_0$ on the secondary virtual storage.

42. The system of claim 41, wherein the controller updates the VSM in response to a save command to reallocate the primary virtual storage to include data written to the secondary virtual storage.

43. The system of claim 42, further comprising an input/output (I/O) device to issue a save command to the controller.

44. The system of claim 43, wherein the I/O device provides a signal to the controller upon actuation of a hardware switch.

45. The system of claim 43, wherein the I/O device issues commands to the controller via a wireless signal.

46. A method comprising:
storing a virtual storage map (VSM) that represents an allocation of a primary virtual storage and a secondary virtual storage within a storage system;
receiving requests from a processor to access the storage system; and
selectively filtering unsupported requests including unpublished vendor-specific requests.

47. The method of claim 46, wherein receiving the requests comprises receiving the requests with a controller coupled between the processor and a storage device via an input/output (I/O) bus.

48. The method of claim 46, wherein storing the VSM comprises storing the VSM in an embedded memory of a controller coupled to the processor via an input/output (I/O) bus.

49. A method comprising:
storing a virtual storage map (VSM) that represents an allocation of a primary virtual storage and a secondary virtual storage;
storing a record of locations of the secondary virtual storage to which data has been written after a time $T_0$;
receiving a save command via a wireless communication; and
adjusting the VSM in response to the save command.

50. The method of claim 49, wherein adjusting the VSM comprises redefining the primary virtual storage to include the data written to the secondary storage device after $T_0$.

51. The method of claim 49, wherein receiving the save command via a wireless communication comprises receiving a signal from a handheld device.

52. An apparatus comprising:
a computer-readable medium to store a virtual storage map (VSM) that represents an allocation of primary virtual storage and a secondary virtual storage within a storage system;
an input/output (I/O); and
a control unit to update the VSM in response to a save command; wherein a controller requires a user to select an operating mode from a default lock mode prior to accepting a save command.

53. The apparatus of claim 52, wherein the control unit receives the save command from software executing on a processor within a host computer.

54. A method comprising:
storing a virtual storage map (VSM) to define a set of storage units for a primary virtual storage and a secondary virtual storage;
storing history data indicating a sequence of save and restore commands; and
storing version data for the storage units of secondary virtual storage, wherein the version data associates one of the commands within the history data with each of the storage units of the secondary virtual storage.

55. The method of claim 54, further comprising:
receiving a save command;
adjusting the VSM in response to the save command; and
updating the history data.

56. The method of claim 55, wherein adjusting the VSM comprises redefining the primary virtual storage to include the data written to the secondary storage device after $T_0$.

57. The method of claim 54, further comprising:
receiving a restore command;
adjusting the VSM in response to the restore command; and
updating the history data.

58. The method of claim 54, further comprising storing a record of locations within the secondary virtual storage to which data has been written after a time $T_0$.

* * * * *